Nov. 22, 1938. C. A. SUNDSTRAND 2,137,366
FOOD GRATER
Filed Feb. 21, 1936
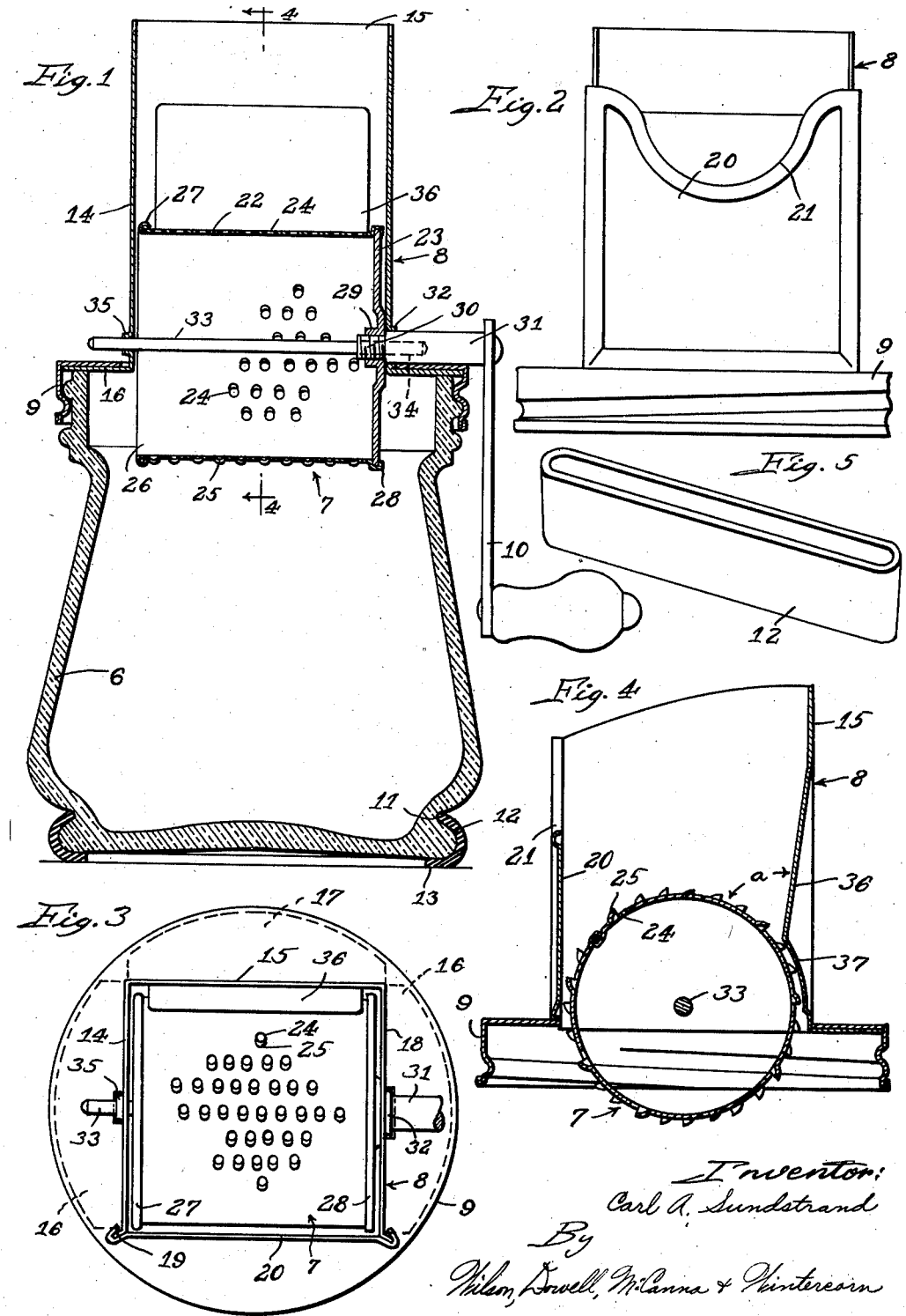
Inventor:
Carl A. Sundstrand Patented Nov. 22, 1938

2,137,366

UNITED STATES PATENT OFFICE 2,137,366

FOOD GRATER

Carl A. Sundstrand, Rockford, Ill.

Application February 21, 1936, Serial No. 65,028

4 Claims. (Cl. 146—91)

This invention relates to food graters, and more particularly one especially designed and adapted for domestic use to grate cheese, crackers, chocolate, toast, cocoanut, nut meats and many other dry and semi-dry foods, quickly and easily.

The principal object of my invention is to provide a food grater of simple, compact, and economical construction which may be taken apart and put together easily so as to permit thorough cleaning of the parts. Most devices of this nature available in the past have been objectionable because certain parts thereof were not accessible for cleaning, and as a result such devices were not sanitary.

Another object is to provide a food grater in which the rotary cylinder while quickly and easily detachable from the hand crank, as required for cleaning, is nevertheless arranged to be accurately and rigidly supported in the bottom of the hopper to turn easily and quietly without scraping on the sides of the hopper. The crank is designed to be attached to the cylinder by threaded connection, the cylinder being held and the handle being turned in one direction for attachment and in the opposite direction for removal.

The invention is hereinafter described by reference to the accompanying drawing, wherein—

Figure 1 is a central, vertical section through the food grater of my invention;

Fig. 2 is a fragmentary front elevation showing the upper portion of the device;

Fig. 3 is a plan view of the device;

Fig. 4 is a cross-section on the line 4—4 of Fig. 1, and

Fig. 5 is a perspective view of a rubber band suitable for use on the base of the jar in the manner shown in Fig. 1.

The same reference numerals are applied to corresponding parts in these views.

The food grater consists of a glass jar 6 to receive the grated food dropping from the open end of the cylinder 7 mounted in the lower end of the hopper 8, which is mounted on the jar 6 as by means of a screw-on cap 9. The cheese or other food-stuff to be grated is placed in the hopper 8, and the cylinder 7 is turned by means of the crank 10. The jar 6 forms a good support for the hopper and is arranged to be held in one hand while the crank is turned with the other. Since the jar is of glass or other suitable translucent material, the operator can observe what amount of food has been grated, and can stop the operation at the right time and no food will be wasted. The use of the jar, as the receptacle for the grated food, dispenses with the need for extra dishes to catch the grated food during the operation of the device. The bottom of the jar is formed with an annular groove 11 to receive a flat rubber band 12 (Fig. 5) which when entered in the groove and stretched for application to the bottom of the jar in the manner illustrated in Fig. 1, provides a lower marginal tread portion 13 to bear on the table top or other supporting surface and prevent slipping. In that way there is no danger of accidentally spilling anything, and, of course, no need for clamping the device to the table. The construction just described is obviously of advantage because it permits the use of a standard form of rubber band as compared with a costlier molded rubber base band specially constructed for the purpose, and enables the housewife to replace a worn out or broken band without trouble or expense. Furthermore, with this construction there is less likelihood of the band getting loose and coming off, inasmuch as it must be stretched to be applied to the jar.

The hopper 8 and cap 9 are similar to what I employed in a nut chopper disclosed in my Patent #2,001,075, issued May 14, 1935. The hopper is suitably stamped from one piece of sheet metal to provide two side walls 14 joined by a back wall 15. The side walls have outwardly bent lugs 16 formed on the lower ends thereof, and the back wall has a similar outwardly bent lug 17 thereon, and these lugs rest on the rim of the jar 6. This permits clamping the hopper by means of the cap 9, which, as clearly appears, has a central opening 18 therein through which the hopper projects, the cap fitting down on top of the lugs 16—17 to clamp the hopper, and at the same time close the mouth of the jar. The front edge of each of the side walls 14 is bent outwardly at an angle to form longitudinal flanges 19 on which the edges of a slide 20 are made to fit, as best appears in Fig. 3, whereby the slide forms a removable front wall for the hopper 8. The cut-away portion 21 at the upper end of the slide permits one to use a thumb or finger to press lightly on the food in the hopper to facilitate the grating thereof. When the slide is removed, one has easy access to every bit of the interior of the hopper to clean the same.

The grating cylinder 7 is formed from two pieces of sheet metal 22 and 23, the piece 22 forming the peripheral wall of the cylinder and the piece 23 closing one end of the cylinder, as clearly appears in Fig. 1. The piece 22 is punched and struck to provide a large number of holes 24 and adjacent outwardly projecting grating teeth 25, the teeth serving to cut particles of food, and the holes 24 permitting these particles to pass from the hopper into the cylinder for discharge through the open end 26 into the jar 6. One end of the peripheral wall 22 is rolled, as indicated at 27, to reenforce the open end of the cylinder and also give a rounded edge for safe cleaning. The other end of this wall is spun over the edge of the end wall 23, as at 28, thus eliminating any exposed sharp edges at that point as well. A hole is punched in the center of the end wall 23 of the cylinder and the wall is swedged inwardly at this point to provide a hollow cylindrical hub 29, which is then tapped to receive the reduced threaded portion 30 of the shaft 31 on the crank 10. The shaft 31 is received in a bearing 32 provided in the adjacent side wall 14 of the hopper. A rod 33 which is pressed into an axial hole 34 in the inner end of the shaft 31 extends through the grating cylinder 7 and out of the open end 26 thereof and is received in a bearing 35 provided therefor in the other side wall 14 of the hopper. The bearings 32 and 35 are formed by punching holes in the side walls 14 and swedging the walls outwardly, as indicated, whereby to provide wider bearing surfaces than would be afforded otherwise. This makes for smooth, easy and quiet operation, and reduces wear to a minimum so that the device will operate satisfactorily indefinitely without lubrication, lubrication being inimical in a food grater. The fact that the grating cylinder has good support at both ends of these bearings 32 and 35 insures accurate alignment of the cylinder with respect to the side walls of the hopper, and there is no likelihood of the cylinder rubbing at one or both ends on the side walls and placing a drag on the operation of the device. The construction permits quick and easy assembling since one can hold the grater cylinder with one hand while the crank is turned with the other, in a clockwise direction to connect the crank to the cylinder and in a counterclockwise direction to disconnect the crank and remove it from the cylinder. Obviously the cylinder is first entered in the hopper before the rod 33 is entered therein. The rod is long enough to enter the bearing 35 before the threaded portion 30 of the shaft 31 is started in the bore of the hub 29. This facilitates assembling for obvious reasons.

Referring to Fig. 4, it will be observed that the back wall 15 of the hopper 8 is bent inwardly above the grating cylinder 7, as indicated at 36, at an acute angle to the plane of the back wall, whereby to give a larger angle *a* between the periphery of the cylinder and the adjacent portion of the back wall and eliminate likelihood of food getting wedged between the cylinder and the back wall, as, for example, tougher rinds and the like. Where the bent-in portion 36 meets the periphery of the cylinder, an arcuate wall 37 is formed extending to the bottom of the hopper with a certain operating clearance allowance between the inside of the arcuate wall 37 and the periphery of the cylinder, as indicated.

I claim:

1. In a food grater, a receptacle, a closure for the top thereof, a hopper supported on said closure comprising sheet metal side walls in spaced parallel relation, a grating cylinder open at one end disposed horizontally in the bottom of said hopper so that a portion of the open end is exposed in the receptacle to discharge grated food therein, said cylinder comprising a peripheral wall, and a sheet metal disk joined to one end of said peripheral wall and closing one end of said cylinder, said disk having a central hole provided therein defined by an inwardly projecting hub portion, said hub being internally threaded, said hopper side walls having coaxial holes provided therein near the top of said closure defined by outwardly projecting bearing portions, and a drive shaft extending centrally through said cylinder and entered in said bearing portions and having an externally threaded portion intermediate the ends thereof threaded in said hub portion.

2. In a food grater, a sheet metal hopper adapted to receive food to be grated, comprising substantially vertical side, back and front walls, a sheet metal grating cylinder open at one end horizontally disposed in the lower portion of said hopper with its ends in closely spaced relation to the adjacent side walls of the hopper, the back wall of said hopper having a portion indented over said cylinder inclined at an acute angle relative to the vertical plane of said wall inwardly toward and over the periphery of said cylinder, the rest of the back wall therebelow being bent in a short arc to the bottom of the hopper, the arcuate portion being concentric with but spaced from the periphery of said cylinder, the inclined and arcuate back wall portion terminating in spaced relation to the side walls of the hopper, said grating cylinder having the ends thereof formed to provide reenforcing annular projecting rim portions extending into the spaces at opposite sides of said inclined and arcuate back wall portions, a closure for the one end of said cylinder secured at its marginal portion to the rim portion on the corresponding end of said cylinder and means connected to said end closure for turning said cylinder.

3. In a food grater, a receptacle, a closure for the top thereof, a hopper supported on said closure comprising sheet metal side walls in spaced parallel relation, a grating cylinder open at one end disposed horizontally in the bottom of said hopper so that a portion of the open end is exposed in the receptacle to discharge grated food therein, said side walls having coaxial holes provided therein in the lower ends thereof above said closure but with the bottom of one of said holes substantially flush with the top of said closure, the holes being defined by outwardly projecting bearing portions, a drive shaft extending through the cylinder and received in said bearing portions, the crank end of said shaft resting on top of said closure for bearing support, and a hand crank extending from said end and rotatable alongside the closure and receptacle.

4. In a food grater, a receptacle, a closure for the top thereof, a hopper supported on said closure adapted to receive food to be grated and comprising spaced substantially parallel side walls, a hollow grating cylinder open at one end disposed horizontally in the bottom of said hopper so that a portion of the open end is exposed below the closure in the receptacle to discharge grated food therein, a drive shaft extending through the cylinder and projecting through the side walls of said hopper and fixed to the closed end of said cylinder, bearings for said shaft in the lower ends of the side walls of said hopper above said closure, said shaft having one projecting end thereof enlarged and resting on top of said closure for bearing support, and a hand crank on the extremity of said enlarged end rotatable alongside said closure and receptacle.

CARL A. SUNDSTRAND.